United States Patent
An et al.

(10) Patent No.: US 9,900,621 B2
(45) Date of Patent: Feb. 20, 2018

(54) METHOD AND APPARATUS OF DISPARITY VECTOR DERIVATION FOR THREE-DIMENSIONAL VIDEO CODING

(71) Applicant: HFI INNOVATION INC.

(72) Inventors: Jicheng An, Beijing (CN); Kai Zhang, Beijing (CN); Jian-Liang Lin, Su'ao Township, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 332 days.

(21) Appl. No.: 14/655,973

(22) PCT Filed: Apr. 10, 2014

(86) PCT No.: PCT/CN2014/075051
§ 371 (c)(1),
(2) Date: Jun. 26, 2015

(87) PCT Pub. No.: WO2014/166403
PCT Pub. Date: Oct. 16, 2014

(65) Prior Publication Data
US 2016/0029045 A1   Jan. 28, 2016

(30) Foreign Application Priority Data
Apr. 12, 2013 (WO) ................ PCT/CN2013/074145

(51) Int. Cl.
*H04N 19/597* (2014.01)
*H04N 13/00* (2018.01)
(Continued)

(52) U.S. Cl.
CPC ........... *H04N 19/597* (2014.11); *H04N 13/00* (2013.01); *H04N 13/0048* (2013.01); *H04N 19/176* (2014.11); *H04N 21/21805* (2013.01)

(58) Field of Classification Search
CPC ..... H04N 19/597; H04N 13/00; H04N 19/176
See application file for complete search history.

(56) References Cited

U.S. PATENT DOCUMENTS

| 9,357,214 B2 * | 5/2016 | Zhang ................. H04N 19/597 |
| 2003/0086013 A1 | 5/2003 | Aratani |
| 2009/0022222 A1 * | 1/2009 | He ....................... H04N 19/597 375/240.12 |

FOREIGN PATENT DOCUMENTS

CN       102006493       4/2011

OTHER PUBLICATIONS

An, J., et al.; "3D-CE2.h related Inter-view scaling for DV derivation;" Joint Collaborative Team on 3D Video Coding Extension Development of ITU-T SG 16 WP 3 and ISO/IEC JTC 1/SC 29/WG 11; Apr. 2013; pp. 1-4.

(Continued)

*Primary Examiner* — Shawn An
(74) *Attorney, Agent, or Firm* — McClure, Qualey & Rodack, LLP (57) ABSTRACT

A method and apparatus of three-dimensional/multi-view coding using aligned reference information are disclosed. The present system aligns the reference information associated with the reference view of the derived DV with the reference information associated with a selected reference view by modifying the selected reference view or by modifying the derived DV or a converted DV derived from depth block pointed by the derived DV. The DV can be derived using the Neighboring Block Disparity Vector (NBDV) process. When the reference view of the derived DV is different from the selected reference view, the system scales the derived DV or changes the converted DV to refer to the selected reference view. The system may also set the selected reference view to the reference view of the derived DV.

15 Claims, 4 Drawing Sheets

(51) Int. Cl.
  *H04N 19/176*  (2014.01)
  *H04N 21/218*  (2011.01)

(56) References Cited

OTHER PUBLICATIONS

Chang, Y.L., et al.; "3D-CE1.h Depth-oriented neighboring block disparity vector (DoNBVD) with virtual depth retrieval;" Joint Collaborative Team on 3D Video Coding Extension Development of ITU-T SG 16 WP 3 and ISO/IEC JTC 1/SC 29/WG 11; Jan. 2013; pp. 1-6.

Takahashi, Y., et al.; "3D-HEVC Alignment of inter-view vector scaling;" Joint Collaborative Team on 3D Video Coding Extension Development of ITU-T SG 16 WP 3 and ISO/IEC JTC 1/SC 29/WG 11; Jan. 2013; pp. 1-8.

International Search Report dated Jul. 8, 2014, issued in PCT Application No. PCT/CN2014/075051.

\* cited by examiner

METHOD AND APPARATUS OF DISPARITY VECTOR DERIVATION FOR THREE-DIMENSIONAL VIDEO CODING

CROSS REFERENCE TO RELATED APPLICATIONS

The present invention is a National Phase application of PCT Application Serial No. PCT/CN2014/075051, filed on Apr. 10, 2014, which claims priority PCT Patent Application, Serial No. PCT/CN2013/074145, filed on Apr. 12, 2013, entitled "Methods for Disparity Vector Derivation". The PCT Patent Applications are hereby incorporated by reference in their entirety.

FIELD OF INVENTION

The present invention relates to video coding. In particular, the present invention relates to disparity vector derivation in three-dimensional/multi-view video coding.

BACKGROUND OF THE INVENTION

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance.

In order to improve multi-view video coding efficiency, multi-view video coding always exploits inter-view redundancy. The disparity between two views is caused by the locations and angles of the two respective cameras. Since all cameras capture the same scene from different viewpoints, multi-view video data contains a large amount of inter-view redundancy. To exploit the inter-view redundancy, coding tools utilizing disparity vector (DV) have been developed for 3D-HEVC (High Efficiency Video Coding) and 3D-AVC (Advanced Video Coding). For example, DV is used as a temporal inter-view motion vector candidate (TIVC) in advanced motion vector prediction (AMVP) and Merge modes. DV is also used as a disparity inter-view motion vector candidate (DIVC) in AMVP and Merge modes. Furthermore, DV is used for inter-view residual prediction (IVRP) and view synthesis prediction (VSP).

The conventional approach to the DV derivation is briefly discussed as follows. In the example of HEVC-based 3D coding Test Model version 6.0 (3DV-HTM 6.0), the DV derivation process includes the following ordered steps:

1. Derive the neighboring block disparity vector (NBDV) associated with a reference view index.
2. Derive the depth-oriented NBDV (DoNBDV) by using the derived NBDV and depth map.

The DV derivation based on 3DV-HTM 6.0 may encounter problems in certain conditions. For example, the view index of the depth map used for DoNBDV derivation is always 0 according to 3DV-HTM. In other words, the depth map is always in the base view. However, there is no restriction for the view index of NBDV. The reference view index of NBDV and the view index of depth map may be different according to 3DV-HTM.

After the DV (NBDV or DoNBDV) is derived, the derived DV may be used for TIVC, DIVC, IVRP and VSP. The problems that the system may encounter are described as follow.

For DoNBDV used for TIVC in AMVP and Merge modes:
The reference view selected for TIVC is always the smallest view ID included in the reference list according to 3DV-HTM 6.0, which may be different from the reference view of the DoNBDV.

For DoNBDV used for DIVC in AMVP and Merge mode:
The selected reference view of DIVC, which is the reference picture, according to conventional 3D-HEVC may be different from the reference view of the DoNBDV.

For NBDV used for IVRP:
The selected reference view of IVRP, which is the base view in current test model, may be different from the reference view of the NBDV.

For NBDV used for VSP:
The VSP process always converts the depth value to a DV with view index 0. The view index of the converted DV may be different from the reference view of VSP.

Figure 1A:
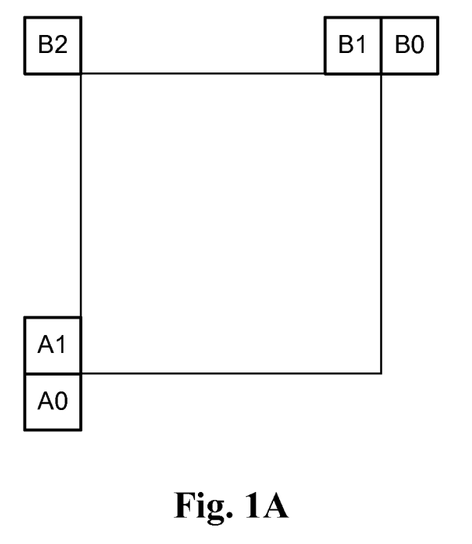
FIG. 1A and FIG. 1B illustrate an example of spatial and temporal neighboring blocks used to derive the disparity vector based on the Neighboring Block Disparity Vector (NBDV) process.
Figure 1B:
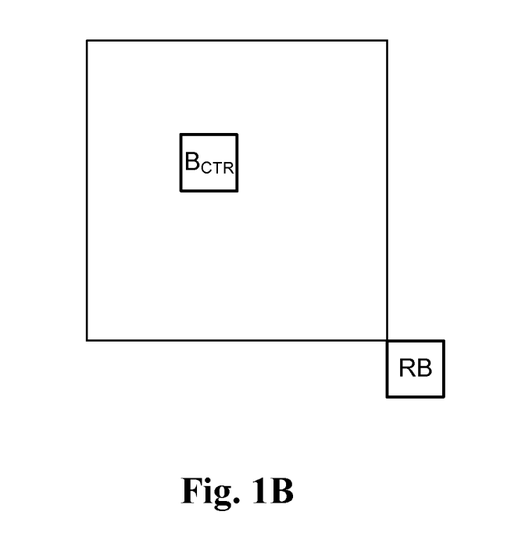

Derivation process of the neighboring block disparity vector (NBDV) is described as follows. The DV derivation is based on the neighboring blocks of the current block, including spatial neighboring blocks as shown in FIG. 1A and temporal neighboring blocks as shown in FIG. 1B. The spatial neighboring block set includes the location diagonally across from the lower-left corner of the current block (i.e., A0), the location next to the left-bottom side of the current block (i.e., A1), the location diagonally across from the upper-left corner of the current block (i.e., B2), the location diagonally across from the upper-right corner of the current block (i.e., B0), and the location next to the top-right side of the current block (i.e., B1). As shown in FIG. 1B, the temporal neighboring block set includes the location at the center of the current block (i.e., $B_{CTR}$) and the location diagonally across from the lower-right corner of the current block (i.e., RB) in a temporal reference picture. Temporal block $B_{CTR}$ may be used only if the DV is not available from temporal block RB. The neighboring block configuration illustrates an example that spatial and temporal neighboring blocks may be used to derive NBDV. Other spatial and temporal neighboring blocks may also be used to derive NBDV. For example, for the temporal neighboring set, other locations (e.g., a lower-right block) within the current block in the temporal reference picture may also be used instead of the center location. In other words, any block collocated with the current block can be included in the temporal block set. Once a block is identified as having a DV, the checking process will be terminated. An exemplary search order for the spatial neighboring blocks in FIG. 1A may be (A1, B1, B0, A0, B2). An exemplary search order for the temporal neighboring blocks for the temporal neighboring blocks in FIG. 1B is (BR, $B_{CTR}$). The spatial and temporal neighboring sets may be different for different modes or different coding standards. In the current disclosure, NBDV may refer to the DV derived based on the NBDV process. When there is no ambiguity, NBDV may also refer to the NBDV process.

Figure 2:
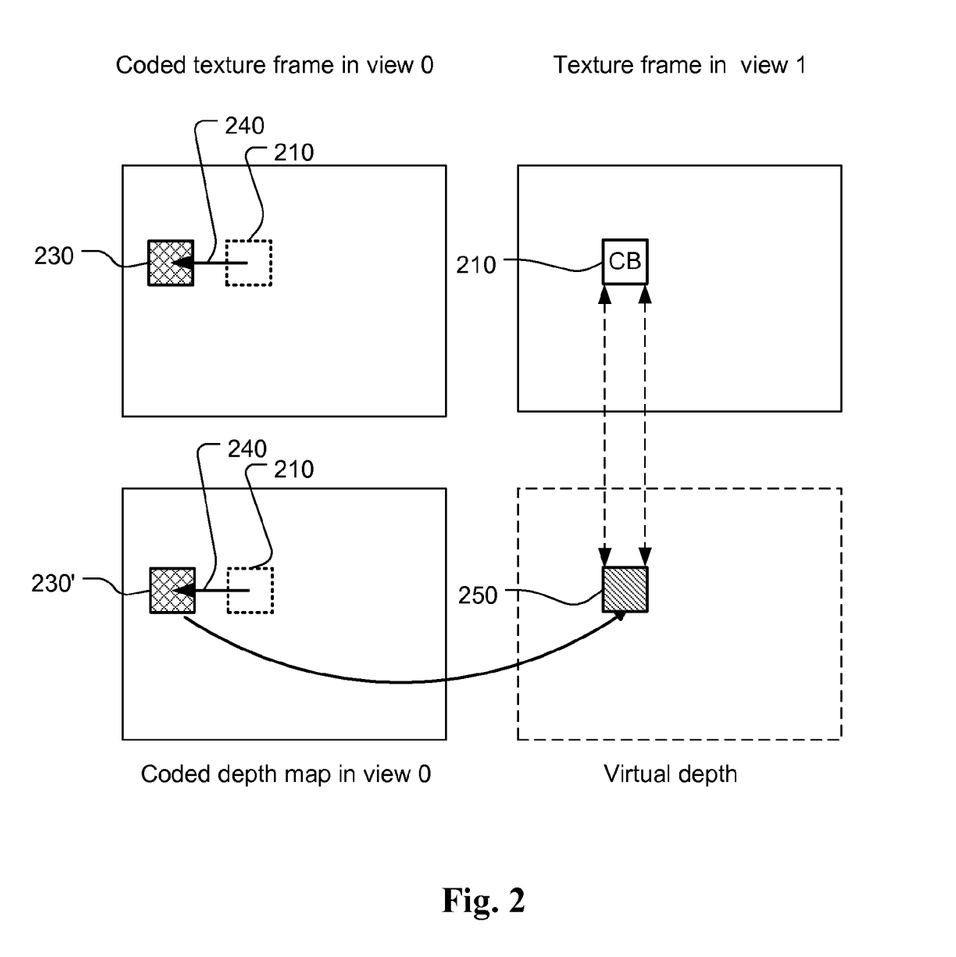
FIG. 2 illustrates an example of the Depth-oriented NBDV (DoNBDV) process where the derived disparity vector is used to locate a depth block according to Neighboring Block Disparity Vector (NBDV) process and a refined disparity vector (i.e., DoNBDV) is determined from depth values of the depth block.

A method to enhance the NBDV by extracting a more accurate disparity vector (referred to as a Depth-oriented NBDV (DoNBDV) in this disclosure) from the depth map is utilized in current 3D-HEVC. A depth block from coded depth map in the same access unit is first retrieved and used as a virtual depth of the current block. This coding tool for DV derivation is termed as DoNBDV derivation. While coding the texture in view 1 with the common test condition, the depth map in view 0 is already coded and available. Therefore, the coding of texture in view 1 can be benefited from the depth map in view 0. An estimated disparity vector can be extracted from the virtual depth shown in FIG. 2. The overall flow is as following:

1. Use the derived NBDV 240 for the current block 210 to locate the corresponding block 230 in the coded texture view.
2. Use the collocated depth 230' in the coded view (i.e., base view according to conventional 3D-HEVC) for current block (coding unit) as virtual depth 250.
3. Extract the maximum value in the virtual depth retrieved in the previous step, and convert it to a disparity vector which is named as DoNBDV.

Inter-View Residual Prediction (IVRP) is another coding tool used in 3D-HTM. To share the previously coded residual information (i.e., temporal residual information) of adjacent views, the residual signal of the current prediction block (i.e., PU) can be predicted by the residual signals of the corresponding blocks in the inter-view pictures. The corresponding blocks can be located by respective DVs. According to the existing 3D-HEVC, the DV is derived using NBDV and the previously coded residual information is always associated with the base view (i.e., view index 0). Inter-View Residual Prediction (IVRP) is also named as Advanced Residual Prediction (ARP). View synthesis prediction (VSP) is a technique to remove interview redundancies among video signal from different viewpoints, in which synthetic signal is used as references to predict a current picture. In 3D-HEVC Test Model, NBDV is used to derive a disparity vector. The derived disparity vector is then used to fetch a depth block in the depth map of the reference view. According to the existing 3D-HEVC, the depth map used is always associated with the base view (i.e., view index 0). The fetched depth block has the same size of the current prediction unit (PU). A maximum depth value is determined from the depth block and the maximum value is converted to a DV. The converted DV will then be used to perform backward warping for the current PU. In addition, the warping operation may be performed at a sub-PU level precision, such as 8×4 or 4×8 blocks. In this case, a maximum depth value is picked for a sub-PU block and used for warping all the pixels in the sub-PU block. The VSP technique is applied for texture picture coding. In current implementation, VSP is also added as a new merging candidate to signal the use of VSP prediction. In such a way, a VSP block may be coded as a skipped block without sending any residual, or a Merge block with residual information coded.

Figure 3:
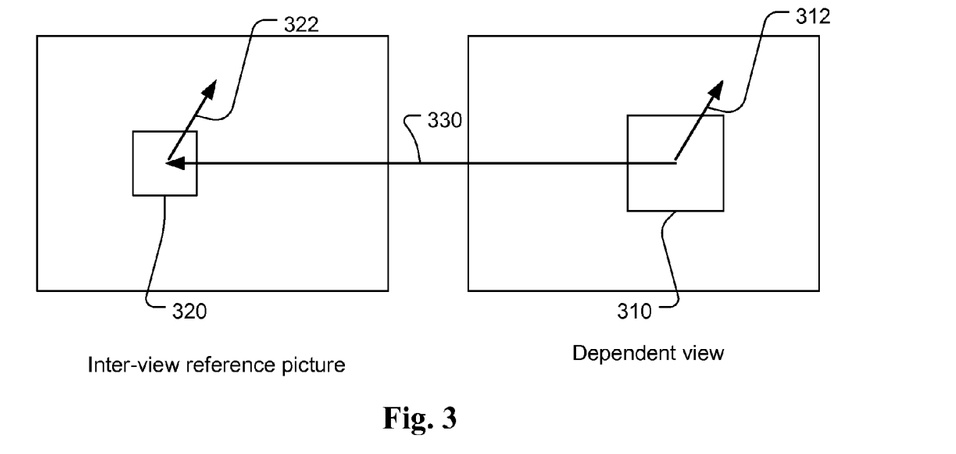
FIG. 3 illustrates an example of inter-view residual prediction, where motion information associated with a reference block in a reference view is used to predict motion information of the current block in a dependent view.

As mentioned before, DV is also used as a temporal inter-view motion vector candidate (TIVC) in advanced motion vector prediction (AMVP) and Merge modes. The process of the inter-view prediction of motion parameters is illustrated in FIG. 3. For deriving the motion parameters of temporal inter-view motion vector candidate (TIVC) for a current PU in a dependent view, a disparity vector 330 is derived for the current PU 310 in a dependent view. By adding the DV to the location of the current PU, a reference sample location 320 is obtained in the inter-view reference view. The prediction block in the already coded picture in the reference view that covers the sample location is used as the reference block. If this reference block is coded using motion compensated prediction (MCP), the associated motion parameters (e.g., MV 322) can be used as the TIVC (e.g., MV 312) for the current PU in the current view. TIVC may also be applied to blocks at sub-PU level. As mentioned before, the reference picture for TIVC is determined according to the smallest view ID in the reference list. On the other hand, the DV is derived according to DoNBDV. Therefore, the reference view associated with the view index may not be the same as the reference view associated with the DV derived from DoNBDV. In this disclosure, TIVC may refer to the MV candidate for TIVC. However, when there is no ambiguity concern, TIVC may also refer to the TIVC process.

The DV can also be used as a Merge candidate for disparity compensated prediction (DCP), which is called the disparity inter-view motion vector candidate (DIVC). DIVC includes a current DV and an associated reference view. The current DV is set equal to the DoNBDV. However, the reference view according to the conventional 3D-HEVC is set to the first reference picture (in terms of reference index) of current slice that has the same POC (Picture order Count) as that of the current slice. Therefore, the situation may rise that the reference picture may have a different view index from the DoNBDV.

Therefore, there will be a problem to use the DV equal to DoNBDV in this case. In this disclosure, DIVC may refer to the inter-view DV candidate. However, when there is no ambiguity concern, DIVC may also refer to the DIVC process.

The above mentioned problems are not present in the comment test condition used to evaluate the performance of 3D-HEVC coding system since inter-view reference pictures other than the base view reference picture are not allowed. However, it would become a problem when the 3D coding tools are allowed to relax the constraint. Accordingly, it is desirable to develop DV derivation method that can be free of the problems mentioned above.

BRIEF DESCRIPTION OF THE INVENTION

A method and apparatus of three-dimensional/multi-view coding using aligned reference information are disclosed. In a conventional three-dimensional/multi-view coding system, a disparity vector (DV) may be derived to refer to reference data for coding a current block in a dependent view. The reference view associated with the derived DV may be different from the reference view selected to provide reference data. Embodiments according to the present invention align the reference information associated with the reference view of the derived DV with the reference information associated with the selected reference view by modifying the selected reference view or by modifying the derived DV or a converted DV derived from the depth block pointed by the derived DV. The selected reference view may correspond to view index 0, the smallest view index in the reference list for the current block, or the first reference picture in a slice having a same POC (Picture Order Count) as the current slice. The derived DV may be determined according to the NBDV (Neighboring Block Disparity Vector) process or the DoNBDV (Depth-Oriented NBDV) process. Furthermore, the derived DV can be used to refer to a reference depth block and the NBDV process selects a candidate neighboring DV with a higher priority if the candidate neighboring DV has a view index equal to the view index of the reference depth block. Modifying the derived DV or the converted DV derived from depth block pointed by the derived DV may correspond to scaling the derived DV to the selected reference view. In another embodiment, modifying the derived DV or the converted DV may correspond to converting a depth value of the depth block to a DV associated with the selected reference view.

The present invention can be applied to the IVRP (Inter-View Residual Prediction) process, where the derived DV is determined according to the NBDV process and the selected reference view corresponds to view index 0. When the reference view associated with the derived DV is different from the reference view with view index 0, modifying the derived DV corresponds to scaling the first DV to view index 0. Alternatively, the selected reference view is set to the reference view of the derived DV. The present invention can be applied to the VSP (View Synthesis Prediction) process, where the derived DV is determined according to the NBDV process, the derived DV refers to a depth block, the converted DV is determined based on one or more depth values of the depth block, and the selected reference view corresponds to view index 0. When the reference view associated with the derived DV is different from view index 0, modifying the derived DV or the converted DV corresponds to converting one or more depth values of the depth block to a converted DV associated with the reference view. The present invention can be applied to the TIVC (Temporal Inter-View Candidate) process, where the derived DV is determined according to the DoNBDV process, the selected reference view corresponds to the smallest view index in the reference list for the current block. When the reference view associated with the derived DV is different from the selected reference view, the derived DV is scaled to the reference view corresponding to the smallest view index in the reference list. Alternatively, an embodiment of the present invention sets the selected reference view to the reference view of the derived DV. The present invention can be applied to the DIVC (Disparity Inter-View Candidate) process, where the derived DV is determined according to the DoNBDV process, the selected reference view corresponds to the first reference picture in a slice having the same POC (Picture Order Count) as the current slice. When the reference view associated with the derived DV is different from the selected reference view, an embodiment of the present invention converts said one or more depth values of the depth block referred by NBDV to a derived DV associated with the selected reference view. Another embodiment scales the derived DV to the selected reference view. In yet another embodiment, the selected reference view is set to the reference view of the derived DV.

DETAILED DESCRIPTION

As mentioned before, the DV derivation methods used in the conventional 3D coding systems such as 3D-HEVC have an issue that the DV derived using various coding tools may be associated with a reference view different from a selected reference view. The reference data pointed by the DV may not be used correctly. In the present invention, DV scaling is used to scale a derived DV pointing to a reference view different from a target reference view. Alternatively, the selected reference view may be modified to align with the reference view of the derived DV.

For example, in the case of DoNBDV, the DoNBDV is derived based on NBDV and depth map. According to the conventional 3D-HEVC, the view index of the depth map is always 0, i.e., the base view. Therefore, it would be a problem if the NBDV points to a reference view different from the base view. In embodiments of the present invention, the NBDV is first derived and the reference view associated with the NBDV is determined as mentioned before. In order to overcome the issue, the DoNBDV process is modified as follows. If the view index of derived NBDV is not equal to the view index of depth map, then the derived NBDV is scaled to the reference view with view index 0. The DV scaling is performed according to the view distance in terms of view indices. The scaled DV can properly point to a reference block in depth map having the same reference view as the NBDV. Alternatively, the depth map having the same view index as that associated with the derived DV is used.

The DV scaling process is described as follows. Parameters NBDVDiff and DepthDiff are determined according to:

NBDVDiff=NBDVViewIdx-CurrViewIdx, and

DepthDiff=DepthViewIdx-CurrViewIdx,

Where NBDVViewIdx corresponds to the view index of NBDV, CurrViewIdx corresponds to the view index of the current view, and DepthViewIdx corresponds to the view index of the depth map. The scaled DV (i.e., ScaledNBDV) can be derived as a scaled version of the NBDV as follows:

x=(16384+(Abs(td) >>1))/td distScaleFactor=Clip3(-4096, 4095, (tb*tx+32) >>6)

ScaledNBDV=Clip3(-32768, 32767, Sign (distScaleFactor*NBDV)* ((Abs(distScaleFactor*NBDV)+ 127) >>8)), where Clip3(a,b,c) is a clipping function that clips value c between a and b, Abs( )is the absolute value function, td and tb are derived as follows:

td=Clip3(-128, 127, NBDVDiff), and tb=Clip3(-128, 127, DepthDiff).

In the above derivation, only the horizontal DV component is scaled since the cameras are usually aligned horizontally. However, if the cameras are vertically aligned, similar derivation can be applied to the vertical direction. After the DV (NBDV or DoNBDV) is derived, the DV (either derived DV from NBDV or refined DV from DoNBDV) will be used for TIVC, DIVC, VSP and IVRP. As mentioned before, the approach based on the conventional 3D-HEVC will encounter problem in some cases. To overcome the issue, embodiments according to the present invention will scale the DV; modify converting the depth value of a depth block pointed by the DV; or change the selected reference view as described below.

In the case that DoNBDV is used to derive the temporal inter-view motion vector candidate (TIVC) for AMVP and Merge modes, embodiments according to the present invention will make one of the following changes to the conventional TIVC process:

1. If the reference view index of TIVC (i.e., the smallest view index in the reference list) is not equal to the reference view index of the DoNBDV, the DV derived from DoNBDV is scaled to the smallest view index according to the view distance in terms of view index.

2. Set the reference view of TIVC to the reference view of DoNBDV. In other words, instead of using the reference view having the smallest view index in the reference list, the embodiment forces the reference view to be the same as the reference view of DoNBDV.

In the above example, when the reference view index of TIVC is equal to the reference view index of the DoNBDV, the DV derived from DoNBDV is used to locate a corresponding block in the reference view without the need of scaling.

In the case that DoNBDV is used for disparity inter-view motion vector candidate (DIVC) in AMVP and Merge modes, embodiments according to the present invention will make one of the following changes:

1. The reference view of DIVC is always selected based on the first reference picture of current slice that has the same POC as that of the current slice. If the selected reference view of DIVC is different from the reference view of the DoNBDV, then the depth value is converted to a DV with view index equal to that of DIVC (i.e., the selected reference view for DIVC).

2. If the reference view of DIVC is different from the reference view of the DoNBDV, then DoNBDV is scaled to the view of DIVC.

3. Set the reference picture to the reference view of DoNBDV. In other words, the reference view with view index equal to that of DoNBDV is used as the reference view of DIVC.

In the cased that NBDV is used for IVRP, embodiments according to the present invention will make one of the following changes:

1. If the reference view index of IVRP (i.e., 0) is different from the reference view index of the NBDV, then the NBDV is scaled to the view of IVRP.

2. Set the reference view of IVRP to the reference view of NBDV. In other words, the reference view with view index equal to that of NBDV, is used as the reference view of IVRP.

In the cased that NBDV is used for VSP, embodiments according to the present invention will make the following change:

1. Set the reference view of VSP equal to the reference view of NBDV, and a maximum depth value from the depth block pointed by the NBDV is converted to a DV with view index equal to the reference view of NBDV.

Figure 4:
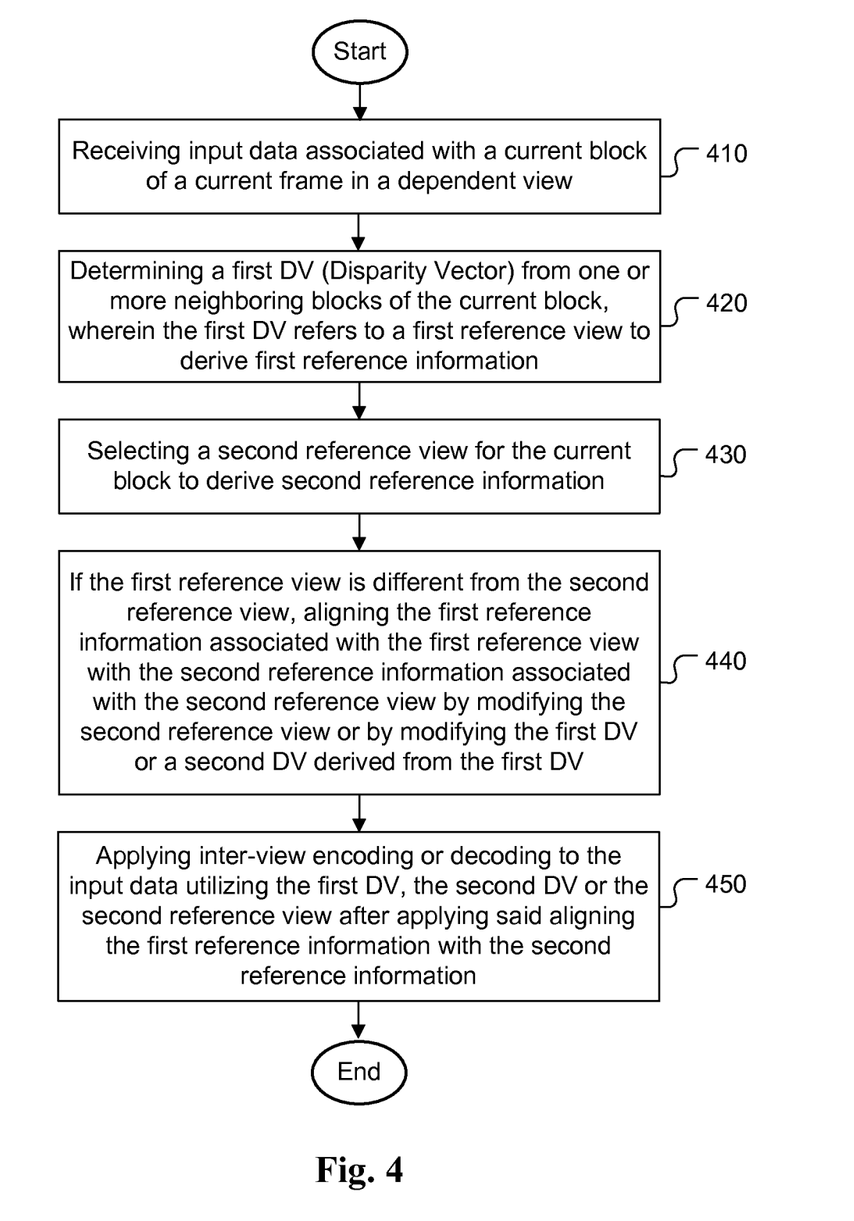
FIG. 4 illustrates an exemplary flowchart for a 3D coding system incorporating aligned inter-view reference information according to an embodiment of the present invention.

FIG. 4 illustrates an exemplary flowchart of a three-dimensional/multi-view coding system incorporating aligned reference information according to an embodiment of the present invention. The system receives input data associated with a current block of a current frame in a dependent view as shown in step 410. For encoding, the input data associated with the current block corresponds to the texture data or depth data to be coded. For decoding, the input data associated with the current texture block corresponds to the coded current block to be decoded. The input data associated with the current texture block may be retrieved from memory (e.g., computer memory, buffer (RAM or DRAM) or other media) or received from a processor. A first DV (Disparity Vector) is determined from one or more neighboring blocks of the current block, wherein the first DV refers to a first reference view to derive first reference information as shown in step 420. A second reference view for the current block is selected to derive second reference information as shown in step 430. If the first reference view is different from the second reference view, the first reference information associated with the first reference view is aligned with the second reference information associated with the second reference view by modifying the second reference view or by modifying the first DV or a second DV derived from the first DV as shown in step 440. After applying said aligning the first reference information with the second reference information, inter-view encoding or decoding is applied to the input data utilizing the first DV, the second DV or the second reference view as shown in step 450.

The flowchart shown above is intended to illustrate an example of 3D/multi-view coding using aligned reference information according to an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video encoding or decoding, the method comprising:
   receiving input data associated with a current block of a current frame in a dependent view;
   determining a first DV (Disparity Vector) from one or more neighboring blocks of the current block, wherein the first DV refers to a first reference view to derive first reference information;
   selecting a second reference view for the current block to derive second reference information;
   if the first reference view is different from the second reference view, aligning the first reference information associated with the first reference view with the second reference information associated with the second reference view by modifying the second reference view or by modifying the first DV according to the second reference view; and
   applying inter-view encoding or decoding to the input data utilizing the first DV or the second reference information after applying said aligning the first reference information with the second reference information.

2. The method of claim 1, wherein the second reference view corresponds to view index 0, a smallest view index in a reference list for the current block, or a first reference picture in a slice having a same POC (Picture Order Count) as a current slice.

3. The method of claim 1, wherein the first DV is determined according to NBDV (Neighboring Block Disparity Vector) process or DoNBDV (Depth-Oriented NBDV) process.

4. The method of claim 1, wherein the first DV is determined according to NBDV (Neighboring Block Disparity Vector) process and the first DV is used to refer to a reference depth block, wherein the NBDV process selects a candidate neighboring DV with a higher priority, wherein the candidate neighboring DV has a view index equal to the view index of the reference depth block.

5. The method of claim 1, wherein said modifying the first DV corresponds to scaling the first DV to the second reference view.

6. The method of claim 1, wherein said modifying the second reference view corresponds to setting the second reference view to the first reference view.

7. The method of claim 1, wherein the first DV refers to a depth block in the first reference view, a second DV of the second reference information is determined based on one or more depth values of the depth block, and said modifying the first DV corresponds to converting said one or more depth values of the depth block to the second reference view.

8. The method of claim 1, wherein the inter-view predictive encoding or decoding corresponds to IVRP (Inter-View Residual Prediction) process, the first DV is determined according to NBDV (neighboring block disparity vector) process, the second reference view corresponds to view index 0 and said modifying the first DV corresponds to scaling the first DV to the view index 0.

9. The method of claim 1, wherein the inter-view predictive encoding or decoding corresponds to IVRP (Inter-View Residual Prediction) process, the first DV is determined according to NBDV (Neighboring Block Disparity Vector) process, the second reference view corresponds to view index 0 and said modifying the second reference view corresponds to setting the second reference view to the first reference view.

10. The method of claim 1, wherein the inter-view predictive encoding or decoding corresponds to VSP (View Synthesis Prediction) process, the first DV is determined according to NBDV (neighboring block disparity vector) process, the first DV refers to a depth block in the first reference view, a second DV is determined based on one or more depth values of the depth block, the second reference view is set equal to the first reference view and said modifying the first DV corresponds to converting said one or more depth values of the depth block to the second reference view.

11. The method of claim 1, wherein the inter-view predictive encoding or decoding corresponds to TIVC (Temporal Inter-View Candidate) process, the first DV is determined according to DoNBDV (Depth-oriented Neighboring Block Disparity Vector) process, the second reference view corresponds to a smallest view index in a reference list for the current block and said modifying the first DV corresponds to scaling the first DV to the second reference view.

12. The method of claim 1, wherein the inter-view predictive encoding or decoding corresponds to TIVC (Temporal Inter-View Candidate) process, the first DV is determined according to DoNBDV (Depth-oriented Neighboring Block Disparity Vector) process, the second reference view corresponds to a smallest view index in a reference list for the current block and said modifying the second reference view corresponds to setting the second reference view to the first reference view.

13. The method of claim 1, wherein the inter-view predictive encoding or decoding corresponds to DIVC (Disparity Inter-View Candidate) process, the first DV is determined according to DoNBDV (Depth-oriented Neighboring Block Disparity Vector) process, the second reference view corresponds to a first reference picture in a slice having a same POC (Picture Order Count) as a current slice and said modifying the first DV corresponds to scaling the first DV to the second reference view.

14. The method of claim 1, wherein the inter-view predictive encoding or decoding corresponds to DIVC (Disparity Inter-View Candidate) process, the first DV is determined according to DoNBDV (Depth-oriented Neighboring Block Disparity Vector) process, the second reference view corresponds to a first reference picture in a slice having a same POC (Picture Order Count) as a current slice and said modifying the second reference view corresponds to setting the second reference view to the first reference view.

15. An apparatus for three-dimensional or multi-view video encoding or decoding, the apparatus comprising one or more electronics configured to:
   receive input data associated with a current block of a current frame in a dependent view;
   determine a first DV (Disparity Vector) from one or more neighboring blocks of the current block, wherein the first DV refers to a first reference view to derive first reference information;
   select a second reference view for the current block to derive second reference information;
   if the first reference view is different from the second reference view, align the first reference information associated with the first reference view with the second reference information associated with the second reference view by modifying the second reference view or by modifying the first DV according to the second reference view; and apply inter-view encoding or decoding to the input data utilizing the first DV or the second reference information after applying said aligning the first reference information with the second reference information.

* * * * *